(12) United States Patent
Cohen Paz

(10) Patent No.: US 11,159,748 B1
(45) Date of Patent: Oct. 26, 2021

(54) STUDIO IN A BOX

(71) Applicant: Guy Cohen Paz, Los Angeles, CA (US)

(72) Inventor: Guy Cohen Paz, Los Angeles, CA (US)

( * ) Notice: Subject to any disclaimer, the term of this patent is extended or adjusted under 35 U.S.C. 154(b) by 0 days.

(21) Appl. No.: 16/928,921

(22) Filed: Jul. 14, 2020

(51) Int. Cl.
| | |
|---|---|
| *H04N 5/28* | (2006.01) |
| *G06F 3/0481* | (2013.01) |
| *G06F 3/16* | (2006.01) |
| *G10L 15/22* | (2006.01) |
| *H04R 1/08* | (2006.01) |
| *H04N 5/225* | (2006.01) |
| *H04R 1/02* | (2006.01) |
| *H04N 5/232* | (2006.01) |
| *G06F 3/14* | (2006.01) |

(52) U.S. Cl.
CPC ............. *H04N 5/28* (2013.01); *G06F 3/0481* (2013.01); *G06F 3/1423* (2013.01); *G06F 3/167* (2013.01); *G10L 15/22* (2013.01); *H04N 5/2253* (2013.01); *H04N 5/232* (2013.01); *H04R 1/028* (2013.01); *H04R 1/08* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 4,688,105 A | * | 8/1987 | Bloch ................. | G07F 17/0042 360/137 |
| 5,130,794 A | * | 7/1992 | Ritchey .................... | F41G 7/30 348/39 |
| 5,495,576 A | * | 2/1996 | Ritchey ................ | H04N 13/194 345/420 |
| 6,086,380 A | * | 7/2000 | Chu ........................ | G07F 17/26 386/308 |
| 2005/0097613 A1 | * | 5/2005 | Ulate .................... | H04N 5/2222 725/86 |
| 2005/0099603 A1 | * | 5/2005 | Thomas ................. | G03B 15/06 352/85 |
| 2005/0100311 A1 | * | 5/2005 | Hohenacker ........... | H04N 5/222 386/210 |
| 2007/0098368 A1 | * | 5/2007 | Carley ................... | H04N 5/772 386/223 |
| 2008/0075436 A1 | * | 3/2008 | Ryckman ............ | G07F 17/3286 386/224 |
| 2008/0198271 A1 | * | 8/2008 | Malki .................... | H04N 5/222 348/722 |
| 2010/0134695 A1 | * | 6/2010 | O'Connell ............. | H04N 5/222 348/722 |
| 2011/0096136 A1 | * | 4/2011 | Liu ........................ | H04N 7/144 348/14.07 |
| 2011/0153045 A1 | * | 6/2011 | Ryckman ............... | G10H 1/361 700/94 |
| 2017/0150068 A1 | * | 5/2017 | David ..................... | G07F 17/16 |
| 2017/0339350 A1 | * | 11/2017 | Ustun ...................... | B60P 3/00 |

* cited by examiner

*Primary Examiner* — Heather R Jones

(74) *Attorney, Agent, or Firm* — Law Office Of Punita Bhasin; Punita Bhasin

(57) ABSTRACT

A studio in a box includes displays arranged along the interior of the studio. A camera and microphone is arranged in the studio to capture a multimedia production, using content shown on the displays as background for the production. Other aspects are described.

19 Claims, 4 Drawing Sheets

STUDIO IN A BOX

FIELD

The present disclosure relates to a multi-media production studio.

BACKGROUND

Production studios are used for creating multimedia content (e.g., audiovisual works) such as, for example, television shows, commercials, music videos, and movies. Typically, these production studios require specialized infrastructure and equipment. These production studios are not generally available to the public.

SUMMARY

A 'studio in a box' includes displays arranged along the interior of the studio. A camera and microphone is arranged in the studio to capture a multimedia production, using content shown on the displays as background for the production. The studio recording booth can give fast access to talent, business owners, and anyone else with a need for high quality production of multimedia content, thereby providing professional studio features to the masses. The system can include one or more displays and backgrounds that performers can rent out and for recording purposes.

The studio can be portable and/or capable of assembly and reassembly, so that the it can be placed and used in locations with exceptionally high foot traffic. Further, the studio in a box can be used by various people and organizations by appointment (e.g., scheduled in advance). People will be able to produce their own shows, content, and distribute it instantaneously to the masses (e.g., through social media, sharing on a web server, and/or other electronic means). Thus, the studio in a box can overcome the need for a big box studio, which most people do not have access to.

In some embodiments, the studio recording booth can include a plurality of walls, a ceiling, and a floor, joined together at respective sides forming an enclosed space (e.g., a booth). One or more cameras and one or more microphones are arranged within the enclosed space. Display panels (e.g., flat screen LCD panels, or other equivalent display technology) line the interior of the enclosed space, thereby providing an immersive experience. For example, a first display panel covers a first of the plurality of walls, and a second display panel covers a second of the plurality of walls. A system controller operates the cameras and the microphones to capture an audiovisual work in the enclosed space. Other features and embodiments are described.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

DETAILED DESCRIPTION

Figure 1:
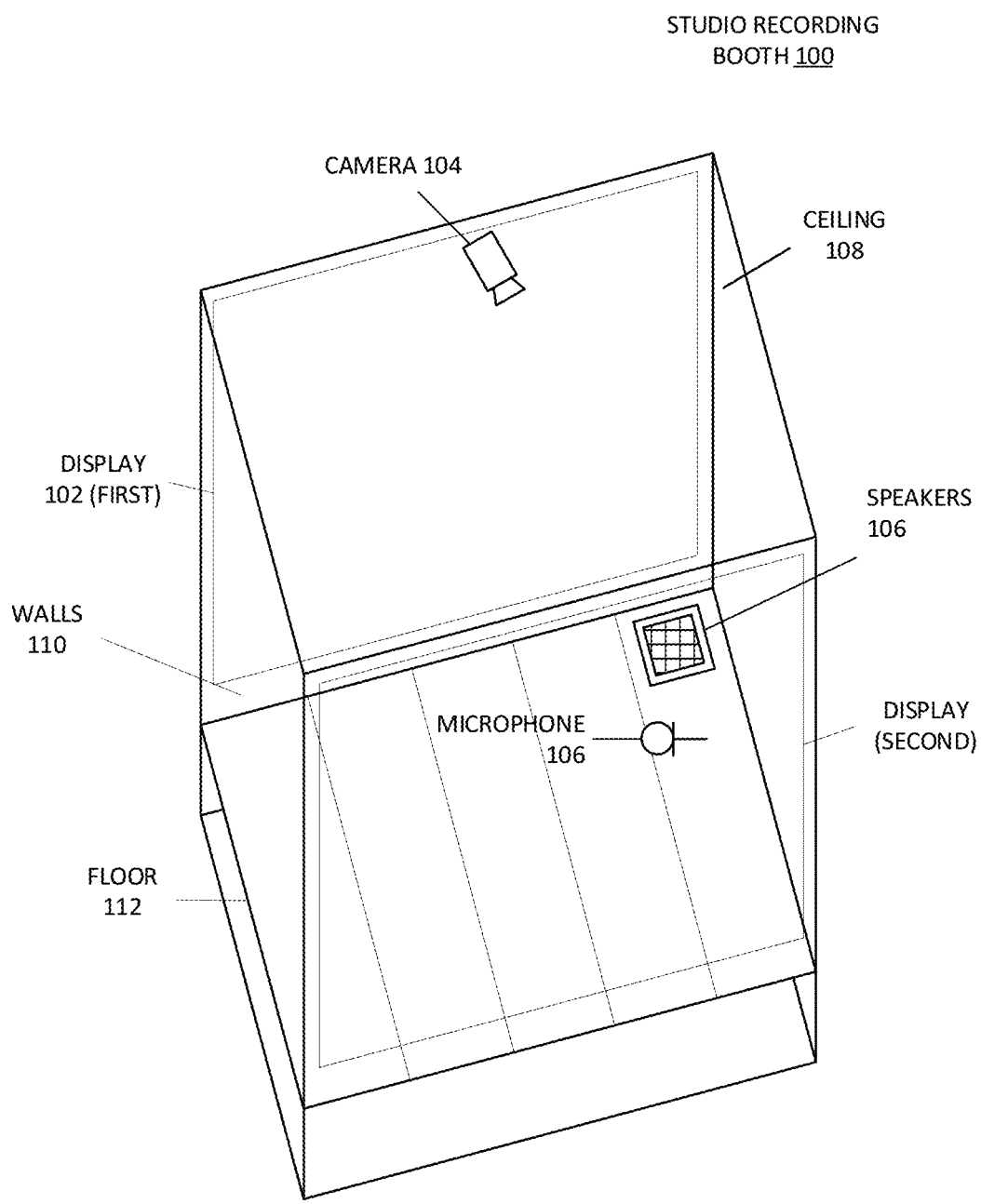
FIG. 1 shows a studio recording booth, according to some embodiments.

Referring to FIG. 1, a studio recording booth 100 is shown that provides access to high quality productions. Generally, the studio includes a plurality of walls 110, a ceiling 108, and a floor 112, joined together at respective sides to form an enclosed space where a user can record and/or stream an audiovisual work, such as a commercial, a self-promotional video, a musical performance, a dance performance, and more. The studio booth includes one or more cameras 104, and one or more microphones 106, arranged within the enclosed space. Being that the space is enclosed, outside noise, light, and other interferences are reduced.

The studio includes at least two display panels 102 including a first display panel covering a first of the plurality of walls, and a second display panel covering a second of the plurality of walls. In some embodiments, each of the walls, ceiling, and/or floor, is substantially covered with a respective display panel (e.g., 80% or greater of a wall surface area is covered) to provide a realistic looking background for a user. Further, displays can be arranged on the ceiling and on the floor, so that the enclosure can provide controllable background content in every direction.

The studio and its components (e.g., the displays, cameras, microphones, speakers, and more) can be managed by a controller, which can include one or more processors, programmed memory, and other known computer technology. The controller can include a plurality of processors distributed between multiple computers working together, or a single integrated computer. The controller can be configured to capture, with the one or more cameras and the one or more microphones, an audiovisual work in the enclosed space. Further, the controller manages the content (e.g., still images or a video comprising a series of images), that is shown on any of the displays. This content can be described as 'background' to the user, to give the appearance in the audiovisual work that the user is placed at the scene shown by the background.

Booth size can vary depending on application. For example, a small booth (e.g., 8×8 feet) can accommodate flexible placement in high-foot traffic areas, while larger booths can be placed in designated spaces (e.g., a field or a parking lot). The booth can be sized like a small, medium, or large room. For example, the walls can have length of 6-14 feet, and height of 7-12 feet.

One or more speakers 106 can output audio content that is synchronized with visual content shown on the displays. For example, the background might show a running river while sounds of the running river are played by the one or more speakers. Thus, the content played by the controller through the speakers and display can be an audiovisual work. In some embodiments, the speakers and microphone can be used to facilitate communication with the user inside the booth, as shown, for example, in FIG. 2.

Figure 2:
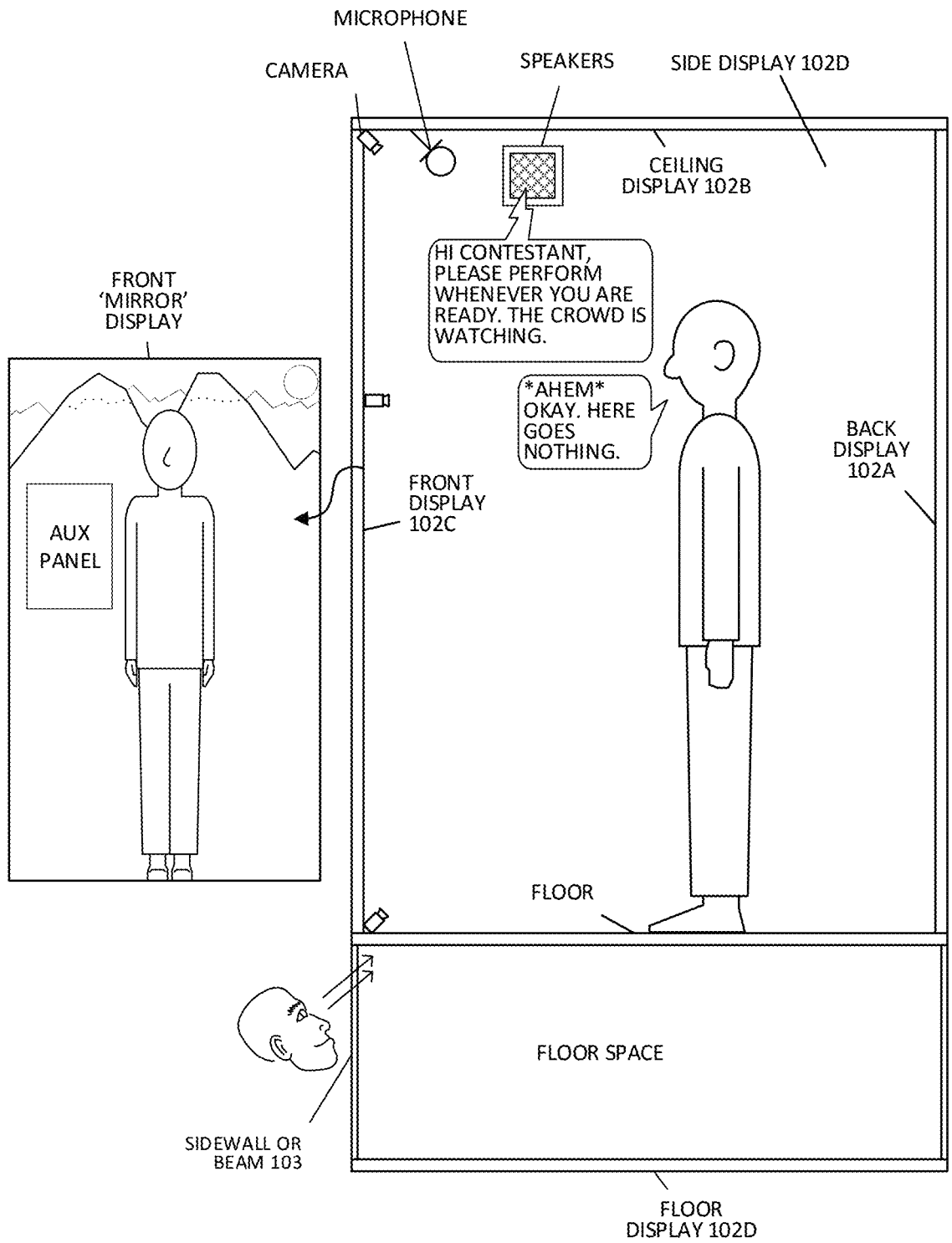
FIG. 2 shows a studio recording booth, according to some embodiments.

FIG. 2 shows aspects of the recording studio, according to some embodiments. The speakers and microphones can be used to facilitate two-way communication between the user inside the booth, and someone outside the studio. This can be particularly useful for directing an actor inside the booth, and for competitions and/or live events where interaction between the user and outside parties is essential.

The display 102A (a background display) and display 102C (a front display) are shown facing each other. Display 102A can show background content. Simultaneously, display 102C can show a mirror image of the user in front of the background content, by rendering a stream of images captured by the one or more cameras onto the front display. This mirror provides the user with instant feedback as to how the user looks in the captured audiovisual work.

In addition to the mirror, an auxiliary panel can be shown on the display can provide the user with acting cues (e.g., scene 1, scene 2, a countdown timer, etc.). In some embodiments, a teleprompter is shown to the user through a display, the teleprompter having text that is changed over time. Although these features can be shown on any of the display panels, in some embodiments, the mirror and teleprompter features are preferably rendered onto the front display (e.g., the side facing the user and opposite the back display).

In some embodiments, social media information (e.g., likes and comments) can be shown one or more of the displays (e.g., on either of the side displays between the front and back display). An outside party (e.g., a social media influencer, a gameshow host, a contest judge, etc.) can be shown on one of the displays, and corresponding audio of the outside party can be output through the speakers, to provide a 'face to face' interaction with the user. The social media information can be shown through a touch screen display, allowing the user to interact with the social media. For example, the display can include a touch-activated keyboard used for input of alphanumeric symbols to respond to likes and comments. Further, the audiovisual content captured in the booth can be directly uploaded onto social media platforms such as, for example, Facebook™, Tik-Tok™, LinkedIN™, and Instagram™, upon request by the user, and/or as a 'live stream'. It should be understood that 'live' or 'real-time' as used herein means that the content is communicated and shown as it is captured, with minimal delays (e.g., communication latency, processing, and buffering).

In some embodiments, any of the walls of the booth can serve as the front display and the back display, depending on which way the user is facing. In other embodiments, the controller can designate default roles for each wall (e.g., front display, back display, side displays). In some embodiments, a wall that has an entrance door is designated as the front wall having the front display, thereby hiding the entrance in the audiovisual work.

The studio recording booth can have displays on each wall (e.g., a first, second, third, and fourth display arranged on a first, second, third, and fourth wall). In some embodiments, displays are also arranged on the ceiling and floor or below the floor.

The controller can play shared content seamlessly through each of the displays. For example, if the content is a forest, each display can show a different part of the forest, the ceiling display can show the treetops and the sky, and the floor display can show grass and dirt.

In some embodiments, the floor display 102D is arranged below the floor upon which the user stands, creating a floor space between the floor and the floor display. The floor, in this case, is transparent (e.g., glass, Plexiglas, a cage). Further, the floor can be visible from outside the recording studio, allowing people passing by to peer into the booth to 'watch' the show. Transparent sidewalls or beams 103 located below the floor can allow outside people to see the floor inside of the booth.

Figure 3:
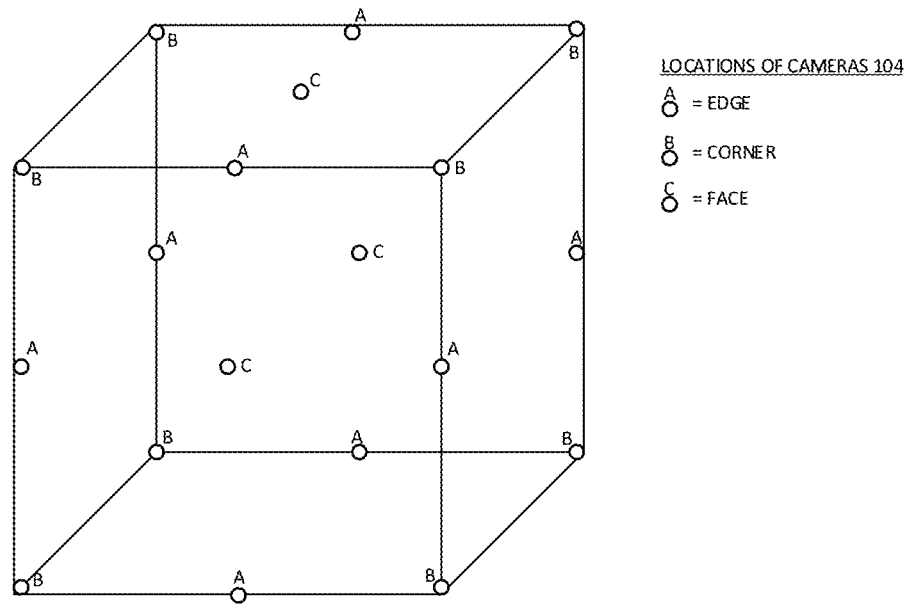
FIG. 3 shows camera locations of a studio recording booth, according to some embodiments.

FIG. 3 shows locations of cameras in a booth, according to some embodiments. The cameras can be located along the edges A and corners B, as well as on wall faces C (e.g., at a center of the wall, placed over or behind the display. In some embodiments, one or more of the cameras are located at eye level. Different cameras can be activated based on user input and/or settings. For example, for some productions, cameras located near the ceiling may be desirable, while in other productions, the user may to capture the production from the side.

The user may specify which cameras are activated and deactivated. The system can support capture and processing of multiple cameras, which can be merged in split displays in a common audiovisual work. Similarly, multiple microphone signals can capture audio. The microphone signals can be processed based to produce optimal recordings (e.g., by filtering the microphones and/or selecting which microphone signal has a highest signal to noise ratio).

The booth can have multiple cameras with different features. For example, some of the cameras may be wide-angle cameras while others have narrower angles. Some cameras may have controllable zoom lenses. Some cameras may have higher resolution capture than others. Shutter speeds of cameras can be automatically controlled and/or manually adjusted by a user.

Figure 4:
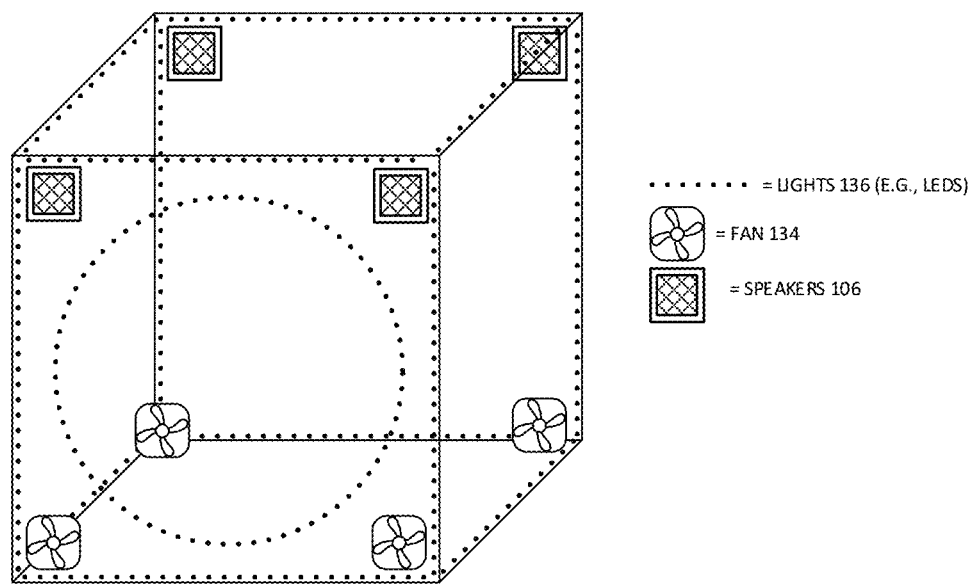
FIG. 4 shows light, fan, or speaker locations of a studio recording booth, according to some embodiments.

FIG. 4 shows locations of lighting, speakers, and fans, according to some embodiments. The studio can include lights 136 (e.g., LED lights, spot lights, and more). Lighting can be adjusted by the controller (e.g., intensity, color, on/off), depending on the environment that the user wishes to portray. Lights (e.g., arrays of LEDs) can be arranged and fixed along the edges of the walls (between the walls, between the walls and the ceiling, and/or between the walls and the floor). On some of the interior surfaces, the lights can be arranged in a circle pattern (as shown), a square, a rectangle, etc.

Further, fans 134 can be fixed at the bottom corners of the booth between the walls and the floor. Further, speakers can be fixed at the top corners of the booth between the walls and the ceiling. These components can be embedded into the walls or fastened over the displays with fasteners. The components shown in FIG. 3 and FIG. 4 can be placed in other locations interior of the booth.

Figure 5:
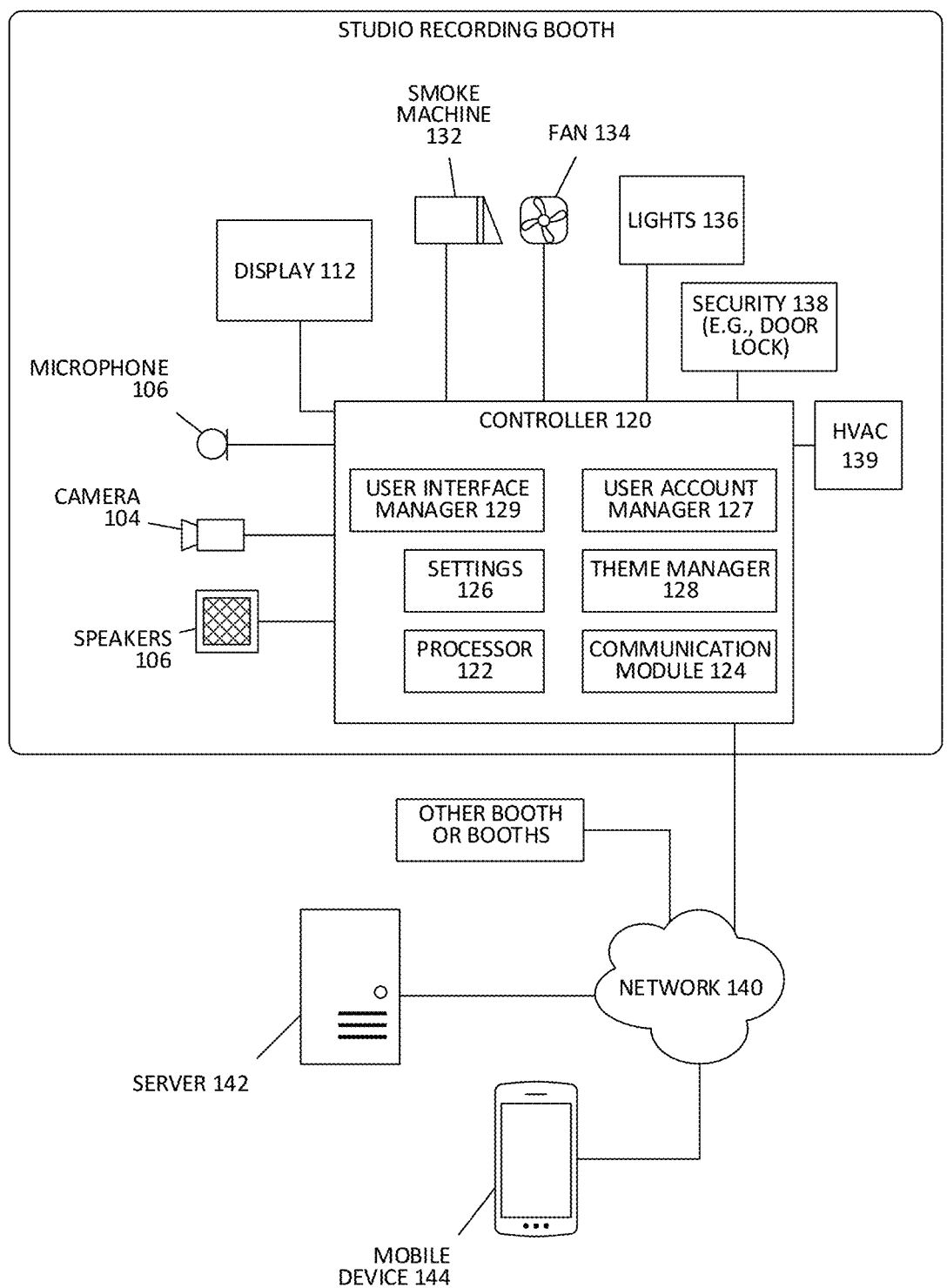
FIG. 5 shows a studio recording booth, according to some embodiments.

FIG. 5 shows a controller 120 that controls different features of the studio recording booth, according to some embodiments. As discussed, the controller can include one or more processors that perform instructions stored on non-transitory computer-readable memory (e.g., computer programs) to manage the studio recording booth. In some aspects, the controller includes a communication module 124 (e.g., a transceiver and/or network ports) that can interface with outside networks 140 through a wired (e.g., Ethernet) or wireless (e.g., Wi-Fi, 3G, 4G, 5G, etc.) communication protocols.

In some aspects, through the network, the booth can communicate with other booths, to provide a synchronized environment of networked booths. For example, the audiovisual streams can be combined as they are captured to provide a live event (e.g., a singing competition or talent show). The booth can 'link up' with other identical or similar booths where users in different booths can communicate with each other through audio connection. Further, video from other users can be shown to the user in the booth on the display, like a teleconference.

A user interface manager 129 can render GUI components onto any of the displays and receive user inputs which can be used to modify different settings as mentioned in other sections. A user can specify the environment of the booth by selecting a background, music, lighting, and other settings. These selections can be made through the graphical user interface that is shown on one of the displays of the booth. In some embodiments, one of the displays is dedicated for user input and has a touch-screen display.

Additionally, or alternatively, the user interface manager can apply speech recognition to microphone signals to sense voice commands, e.g., 'pause', 'start', 'stop', 'record', 'increase volume', 'camera off', 'camera 3 active', 'louder', 'mute', and more. In some embodiments, the settings are managed based on requests received by an application on a mobile device (e.g., a phone 'app'). Thus, a user can control the booth with their phone.

The controller operates booth components such as speakers, cameras, microphones, the displays, a smoke machine 132, fans, lights, and HVAC 139. Operation of these components can be performed based on different settings configured by the user and/or administrators. Users might specify settings relating to the audiovisual work such as background content and camera angles, but administrators can control more general settings like temperature control, power management, software updates, security, and more.

The controller can manage different themes. A theme groups different settings 126 such as, but not limited to, visual content to be shown on the at least display panels, audio content that plays through the one or more speakers, lighting settings, camera settings, speaker loudness, microphone reverb, microphone loudness, fan, smoke machine, and more, into a single cohesive package to make help manage different 'environments'. For example, a beach theme can have a beach background, beach sounds (e.g., seagulls, ocean, etc.), bright lighting, and turn a fan on to generate a slight wind. The themes can be managed by the controller or a networked server. A theme manager 128 can store one or more different themes that are each associated with different settings, so that a user can quickly apply a group of settings to achieve a desired environment.

Users can have user accounts that are associated with preferred settings, payment information, and stored works of a particular user. The user accounts can be managed by a server 142, a mobile device 144, and/or locally in the studio recording booth. A user can configure each setting as they see fit from inside or outside of the booth.

The controller can manage scheduling of the booth. The controller can schedule one or more user sessions based on a booking request received from an external device such as a networked computer using a web application, or through an 'app' on a mobile computing device. Each user session can have a start time, duration, and/or end time. The controller can keep track of which users are allowed entrance to the booth, at given times. The scheduling can also be performed on a first-come first-serve basis with a pay-as-you-go model. Further, when a user session is over, the controller can 'shut down' or provide a limited amount of functionality to the user to wrap up and leave the booth.

The studio can include a security system 138 managed by the controller. The security system can include one or more locking devices to manage entry through an entrance door of the studio. The controller can receive verification of identity, for example, through a user password and/or request received through communication with a mobile device of the user. The controller can unlock the door when the user is verified, then lock the door when the user leaves.

In some embodiments, the studio booth is portable, e.g., it has a hitch (attachable to a truck) and/or wheels. In some aspects, the studio booth is integrated with a vehicle (e.g., like a camper). In some embodiments, the studio booth is not fixed to a building foundation (e.g., cement, steel, etc.). In some embodiments, the plurality of walls, the ceiling, and the floor have fasteners that provide for assembly and disassembly. The fasteners can include one or more of: latching mechanisms that can open and close, clips, bolts, screws, and more.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. Further, various features shown with various embodiments and not tied to a particular embodiment and can be combined in different variations of the booth, without departing from the scope of the present disclosure.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A studio recording booth, comprising:
    one or more cameras;
    one or more microphones;
    a plurality of walls, a ceiling, and a floor, joined together at respective sides forming an enclosed space,
    a plurality of display panels including a first display panel covering a first of the plurality of walls, a second display panel covering a second of the plurality of walls, a third display panel covering a third of the plurality of walls, a fourth display panel covering a fourth of the plurality of walls, a fifth display arranged on the ceiling, and a sixth display arranged below the floor, wherein the floor that the user stands upon is visible from outside the recording studio; and
    a controller, configured to capture, with the one or more cameras and the one or more microphones, an audio-visual work in the enclosed space.

2. The studio recording booth of claim 1, wherein the controller is configured to cause a rendering of a background, comprising an image or series of images, onto a first display.

3. The studio recording booth of claim 1, wherein the background is selected based on input selection by a user, or a setting.

4. The studio recording booth of claim 1, wherein the second display and the first display are facing each other, and the controller is configured to cause a rendering a stream of images captured by the one or more cameras, that include the user and the first display, onto the second display.

5. The studio recording booth of claim 4, wherein the third of the plurality of walls is between the first and the second of the plurality of walls, and the fourth of the plurality of walls is located between the first and the second of the plurality of walls, opposite of the third of the plurality of walls.

6. The studio recording booth of claim 1, wherein a background, comprising an image or series of images, is seamlessly shared across the second display, the third display, and the fourth display.

7. The studio recording booth of claim 1, wherein the floor that the user stands upon is transparent.

8. The studio recording booth of claim 1, further comprising one or more speakers that include audio that is synchronized with content shown on the at least two display panels, or received from outside of the recording studio.

9. The studio recording booth of claim 1, wherein the recording studio is portable, having a hitch, wheels, and is not fixed to a building foundation.

10. The studio recording booth of claim 1, wherein the plurality of walls, the ceiling, and the floor have fasteners that provide for assembly and disassembly.

11. The studio recording booth of claim 1, wherein the controller schedules one or more user sessions based on a booking request received from an external device, including at least one of a networked computer or a mobile computing device.

12. The studio recording booth of claim 1, wherein the controller receives user input through a) a graphical user interface rendered on the at least two display panels, or b) a voice command sensed through the one or more microphones of the recording studio.

13. The studio recording booth of claim 1, wherein modes that are managed by the controller, each mode specifying settings for a user session, the settings including one or more of: visual content to be shown on the at least display panels; audio content that plays through the one or more speakers, lighting settings, camera settings.

14. The studio recording booth of claim 1, wherein a teleprompter is shown to the user, the teleprompter having text that is changed over time.

15. The studio recording booth of claim 1, wherein the controller is further configured to manage a lock of a door for entrance into the recording studio.

16. The studio recording booth of claim 15, wherein the controller manages the lock of the door based on requests generated by an application on a remote server or mobile device.

17. The studio recording booth of claim 1, further comprising lights arranged along the edges of the walls.

18. The studio recording booth of claim 1, further comprising one or more smoke machines.

19. The studio recording booth of claim 1, further comprising one or more fans.

\* \* \* \* \*